United States Patent
Sieber et al.

(10) Patent No.: US 9,651,026 B2
(45) Date of Patent: May 16, 2017

(54) WIND TURBINE WITH ELECTROMAGNETIC WAVE TRANSMISSION SYSTEM

(75) Inventors: Andreas Sieber, Kirchheim (DE); Clemens Kunert, Unterfohrung (DE); Rainer Großkopf, Grasbrunn (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 607 days.

(21) Appl. No.: 13/822,261

(22) PCT Filed: Sep. 23, 2010

(86) PCT No.: PCT/EP2010/064045
§ 371 (c)(1),
(2), (4) Date: Mar. 11, 2013

(87) PCT Pub. No.: WO2012/037976
PCT Pub. Date: Mar. 29, 2012

(65) Prior Publication Data
US 2013/0272875 A1    Oct. 17, 2013

(51) Int. Cl.
*F03D 9/00* (2016.01)
*F03D 1/06* (2006.01)
*F03D 80/00* (2016.01)

(52) U.S. Cl.
CPC ............... *F03D 9/002* (2013.01); *F03D 1/06* (2013.01); *F03D 9/00* (2013.01); *F03D 80/00* (2016.05); *F16C 2360/31* (2013.01); *Y02E 10/721* (2013.01)

(58) Field of Classification Search
CPC .......... F03D 9/00; F03D 9/002; H04B 7/0805
See application file for complete search history.

(56) References Cited

U.S. PATENT DOCUMENTS

| | | | | |
|---|---|---|---|---|
| 5,701,603 A | * | 12/1997 | Norimatsu | H04B 7/0805 343/876 |
| 6,965,295 B2 | * | 11/2005 | Shimonomoto | B60R 25/246 340/10.34 |
| 7,908,923 B2 | * | 3/2011 | Bosselmann | G01B 15/00 702/33 |
| 7,969,381 B2 | * | 6/2011 | Kanazawa | H01Q 1/243 343/700 MS |
| 8,177,505 B2 | * | 5/2012 | Scholte-Wassink | F03D 80/00 416/1 |

(Continued)

FOREIGN PATENT DOCUMENTS

| | | |
|---|---|---|
| EP | 2 037 120 A1 | 3/2009 |
| EP | 2 194 400 A1 | 6/2010 |

OTHER PUBLICATIONS

International Search Report dated Jun. 15, 2011, issued in PCT/EP2010/064045, filed Sep. 23, 2010.

(Continued)

*Primary Examiner* — Audrey K Bradley
*Assistant Examiner* — Shafiq Mian
(74) *Attorney, Agent, or Firm* — Workman Nydegger

(57) ABSTRACT

A wind turbine includes at least one blade (5a) and apparatus for converting movement of the at least one blade (5a) in electric energy. The wind turbine also includes at least one antenna (6a) included in the at least one blade (5a), and a transmitter circuit (70) for feeding the antenna (6a) with a signal (71) to be radiated.

13 Claims, 11 Drawing Sheets

(56) References Cited

U.S. PATENT DOCUMENTS

| | | | |
|---|---|---|---|
| 8,197,207 B2* | 6/2012 | Petersen | F03D 7/024 416/61 |
| 8,351,849 B2* | 1/2013 | Ying | H04B 1/406 343/729 |
| 2003/0222756 A1* | 12/2003 | Shimonomoto | B60R 25/246 340/5.61 |
| 2004/0232703 A1 | 11/2004 | Michael | |
| 2007/0159346 A1 | 7/2007 | Wesselink | |
| 2008/0024352 A1* | 1/2008 | Shirakawa | G01S 13/003 342/28 |
| 2009/0058657 A1* | 3/2009 | Tuttle | G06K 7/10316 340/572.7 |
| 2009/0149146 A1* | 6/2009 | Emrick | H01Q 3/2605 455/277.2 |
| 2009/0207079 A1* | 8/2009 | Samukawa | G01S 7/032 342/378 |
| 2010/0021298 A1* | 1/2010 | Sandvad | F03D 7/047 416/1 |
| 2010/0098541 A1* | 4/2010 | Benito | F03D 7/0224 416/36 |
| 2010/0124498 A1* | 5/2010 | Kabatzke et al. | 416/61 |
| 2010/0177655 A1* | 7/2010 | Duenyas | H04W 24/06 370/252 |
| 2010/0203842 A1* | 8/2010 | Tachikawa | H04B 7/061 455/73 |
| 2010/0220818 A1* | 9/2010 | Yamamoto | H04H 20/42 375/340 |
| 2010/0284787 A1* | 11/2010 | Petersen | F03D 7/024 415/119 |
| 2010/0320005 A1* | 12/2010 | Burhan | B22F 7/06 175/426 |
| 2011/0150649 A1* | 6/2011 | White | B64C 27/006 416/61 |
| 2011/0248846 A1* | 10/2011 | Belov | H04Q 9/00 340/539.1 |

OTHER PUBLICATIONS

International Preliminary Report on Patentability dated Nov. 2, 2012, issued in PCT/EP2010/064045, filed Sep. 23, 2010.

* cited by examiner

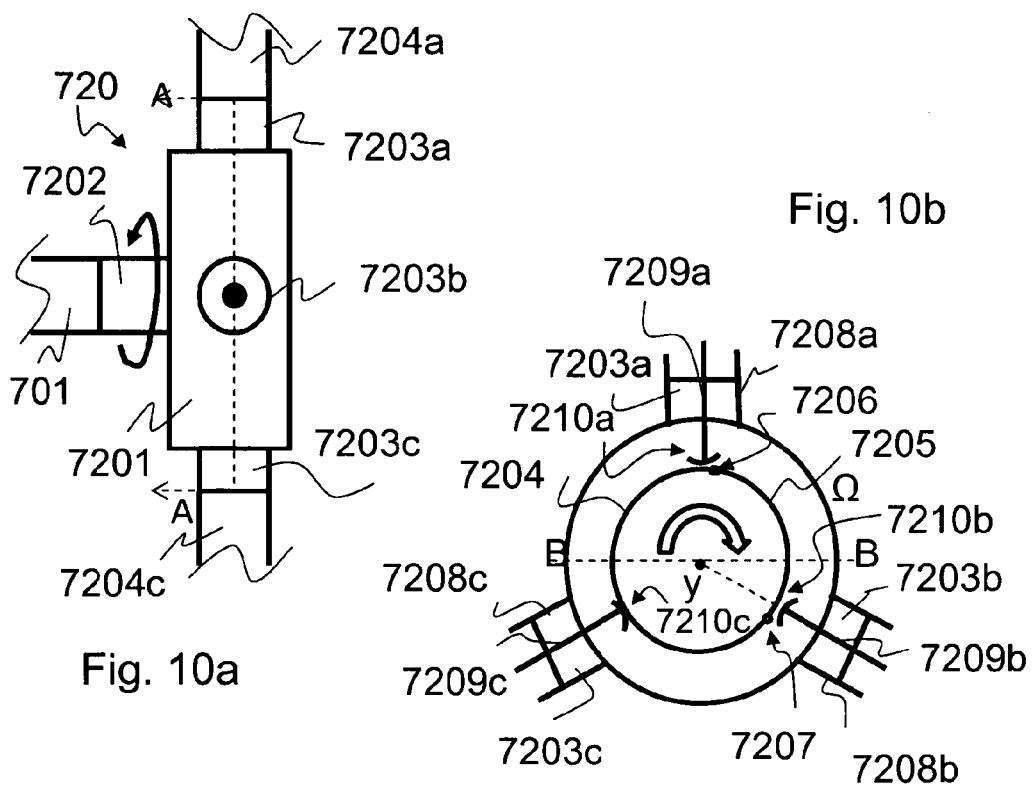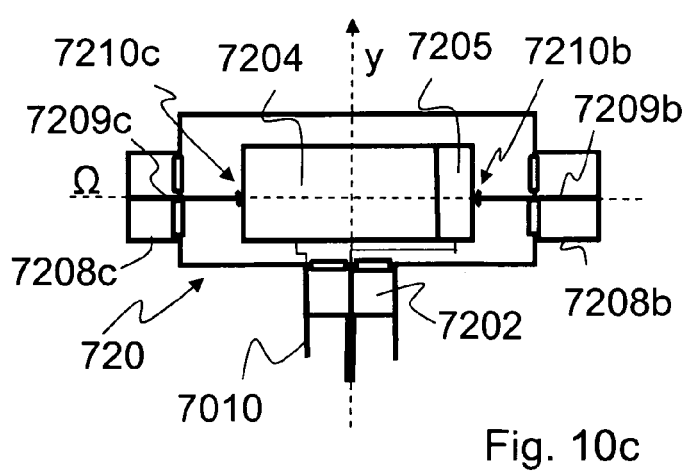

WIND TURBINE WITH ELECTROMAGNETIC WAVE TRANSMISSION SYSTEM

FIELD OF THE INVENTION

The present invention relates to wind turbines and particularly relates to a wind turbine comprising an electromagnetic wave transmission system.

The invention further relates to a method for controlling the above wind turbine in order to transmit electromagnetic waves with desired polarization.

BACKGROUND OF THE INVENTION

It is known that wind may be used for generating electric power by means of wind turbines, also called wind energy systems.

The most common type of wind turbine is the horizontal axis wind turbine, which comprises one or more blades vertically mounted on a rotor hub. When blades are hit by wind, the rotor hub rotates around an horizontal axis and a rotor shaft transmits movement to an electric generator which converts mechanical energy in electric energy.

The rotor hub and the electric generator are placed on the top of a tower which is very tall in order to capture winds stronger than the ones at ground level.

Long conductor wires are used to transport electric energy from the electric generator to the electric grid, or other types of loads such as a battery, which is placed on the bottom of the tower.

While the use of wind turbines is welcome and pushed in order to increase the production of "green" energy, on the other hand wind turbines present several drawbacks.

First of all when there's no wind or when there's too much wind, wind turbines do not work, therefore they just waste the landscape (so called visual pollution). Moreover, when grouped in large wind farms, wind turbines can interfere with terrestrial radio communications (such as television, radio and cell phones) and radar signals.

OBJECTS AND SUMMARY OF THE INVENTION

It is an object of the present invention to provide a wind turbine which can be used not only for generating energy, and in particular that can be used also when the blades do not move.

It is an object of the present invention to provide a wind turbine which can be used in telecommunication networks instead of interfering with them. In particular, it is also an object of the present invention to provide a method for transmitting electromagnetic waves with linear or circular polarization using a wind turbine.

These and further objects of the present invention are achieved by a wind turbine incorporating the features of the annexed claims, which form integral part of the present description.

According to one aspect of the invention, at least one antenna is included into a blade of a wind turbine. A transmitter circuit is electrically connected to the antenna and feeds the antenna with a signal to be transmitted.

In this way, when the turbine is not used as an electric generator (e.g. because there's no wind), it can be used as an antenna of a communication system. In particular, since the antenna is integrated into the blade, the latter can be used for transmitting signals with horizontal or vertical polarization by controlling the position of the blade and the generation of the signal to be transmitted.

Moreover, by controlling the signals transmitted by the blade, the wind turbine can be used as an active part of a communication network, thus avoiding interference with other communication networks.

Preferably the wind turbine comprises three blades, each one provided with an antenna, and a switching unit for dynamically connecting the transmitter circuit to one selected antenna at a time, while preferably connecting the others to a reference potential. As an example, the switching unit connects the transmitter circuit to the vertical blade, while connecting the other two blades to a reference potential, in particular a ground plane; in this way the antennas work as a vertical dipole emitting vertical polarized electromagnetic radiations. Alternatively, the switching unit connects the transmitter circuit to the blade that is placed in a predetermined space position at a predetermined time, so as to generate circular polarized waves.

Therefore by controlling the switching of the signals on the blades of the wind turbine, it is possible to use the latters to simulate the electromagnetic field generated by dipoles with desired directions.

According to another aspect of the invention, a wind farm may comprise a plurality of wind turbines opportunely spaced and provided with a transmitter circuit transmitting the same signal in a synchronized way (with different or identical polarization) so as to implement a MIMO configuration for spatial multiplexing.

According to another aspect of the invention, the wind turbine is configured as a repeater of a telecommunication network and to this purpose comprises a receiver apparatus suitable for receiving signals coming from external devices. The received signal is processed in order to obtain the signal to be transmitted via the transmitter circuit and the antenna/s integrated in the blade/s.

BRIEF DESCRIPTION OF THE DRAWINGS

Further features and advantages of the invention will be more apparent upon reading the detailed description of preferred, non-exclusive embodiments of a method and a system for transmitting electromagnetic waves signals according to the invention, which are described as non-limiting examples with reference to the annexed drawings, in which:

FIG. 10a is a side view of a signal circulator used in the embodiment of FIG. 10;

FIG. 10b is a top view of signal circulator of FIG. 10a along section A-A;

FIG. 10c s a top view of signal circulator of FIG. 10a along section B-B;

These drawings illustrate different aspects and embodiments of the present invention and, where appropriate, like structures, components, materials and/or elements in different figures are indicated by similar reference numbers.

DETAILED DESCRIPTION OF A PREFERRED EMBODIMENT

Figure 1:
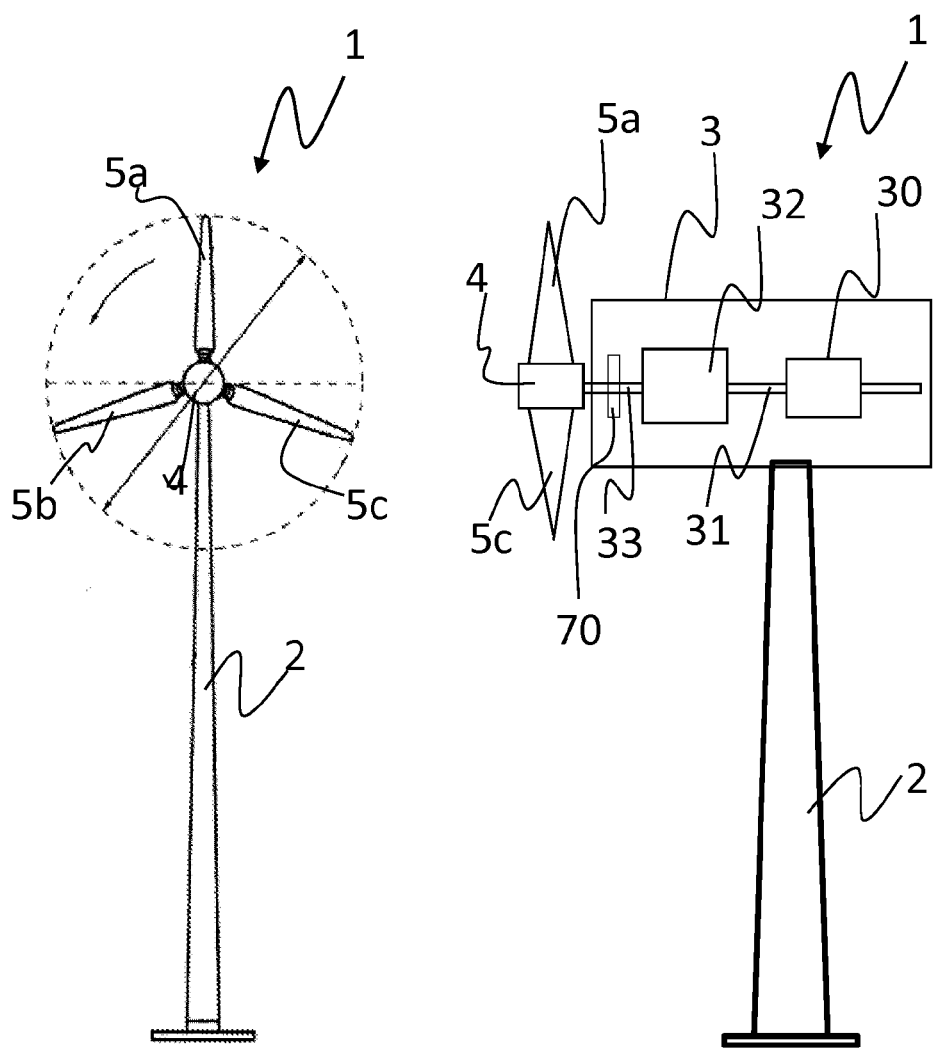
FIG. 1 shows a front and a lateral view of a wind turbine according to the invention.

FIG. 1 shows a front and a lateral view of a wind turbine (generally indicated with number 1) for transmitting electromagnetic waves according to the invention.

In the embodiment of FIG. 1, wind turbine 1 is a horizontal axis wind turbine and comprises a tower 2 supporting a nacelle 3 which comprises an electric generator 30, a high speed rotor shaft 31, a gearbox 32 and a main rotor shaft 33.

A three blades rotor hub 4 is connected to the main rotor shaft 33 so as to rotate it when wind moves the blades 5a, 5b and 5c. Gearbox 32 allows high speed rotor shaft 31 to rotate at higher speed so as to drive generator 30 which generates electric energy.

While in the preferred embodiment described with reference to FIG. 1 the wind turbine comprises three blades, in other embodiments the wind turbine can comprise a different number of blades, as an example wind turbine 1 can comprise one single blade or two blades.

As not limiting examples, blades 5a, 5b and 5c may be made of fibreglass, carbon fibre or other composite materials according to weight and resistance requirements. For the purpose of the present invention, blades 5a, 5b and 5c are preferably made of non conductive material in order to avoid Faraday cage effect.

Figure 2:
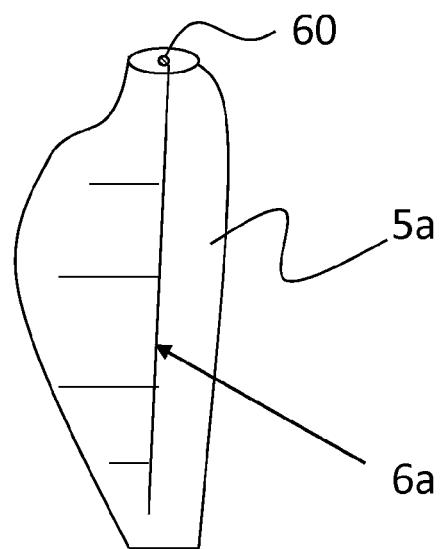
FIG. 2 shows a blade of the wind turbine of FIG. 1.

FIG. 2 shows a schematic representation of blade 5a including an antenna 6a to radiate signals received as input. In the following embodiment blades 5b and 5c are identical to blade 5a and include a respective antenna 6a and 6b; for this reasons in the following only blade 5a is described.

Antenna 6a may be a simple dipole antenna, a Yagi antenna, a horn antenna, a parabolic antenna, an antenna array or any other type of known antenna.

In the embodiment of FIG. 2, blade 5a has a hollow body and antenna 6a is placed inside it, i.e. into the space delimited by the blade surface. In an alternative embodiment blade 5a may have a solid body (e.g. antenna can be filled with foam) including antenna 6a.

Antenna 6a is preferably connected to the blade's body by means of removable fastening means which allows easy removing of the antenna during maintenance of the same. Alternatively, antenna 6a can be fixed (e.g. glued) on the blade's internal or external surface. Positioning of antenna 6a inside the blade 5a is preferred because the antenna is protected from rain, snow and wind.

Generally, it is sufficient for the invention that at least one blade 5a comprises an antenna 6a.

Antenna 6a comprises a connector 60 for connection to a signal generator unit 7.

Figure 3:
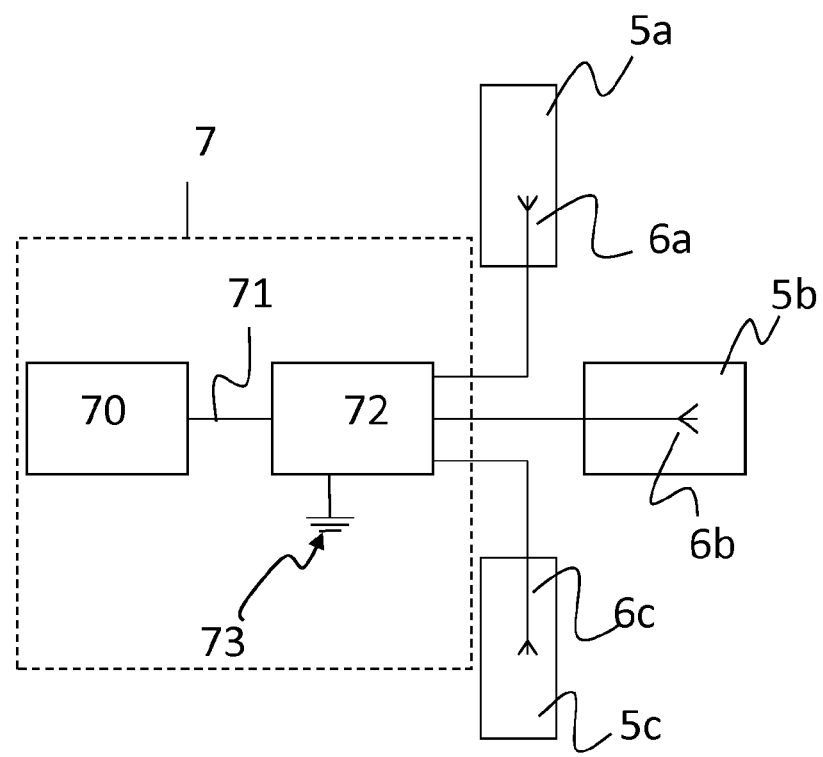
FIG. 3 is a schematic representation of the transmitter circuit of the wind turbine of FIG. 1.

FIG. 3 shows a schematic representation of the signal generator unit 7 and of the antennas 6a, 6b and 6c included in the three blades of the wind turbine 1 of FIG. 1. In this embodiment, signal generator unit 7 comprises a transmitter circuit 70 that generates a transmission signal 71 and provides it to one or more antennas. The transmission signal 71 is an electric signal adapted to be radiated and transmitted by antennas 6a, 6b and 6c. In a preferred embodiment transmitter circuit 70 is an electronic system comprising one or more filters, oscillators, phase locked loops and power amplifiers.

In the embodiment of FIG. 3, transmitter circuit 70 and antennas 6a, 6b and 6c are connected via a switching unit 72.

Switching unit 72 comprises two inputs: one being connected to the transmitter circuit output, and the other to a reference potential 73, in particular a ground potential, that can be taken either by the metallic structure of the tower, or better from the metallic shield of a coaxial cable transporting the transmission signal 71. Switching unit 72 is further provided with three outputs to which the three antennas 6a, 6b and 6c are connected.

Figure 4:
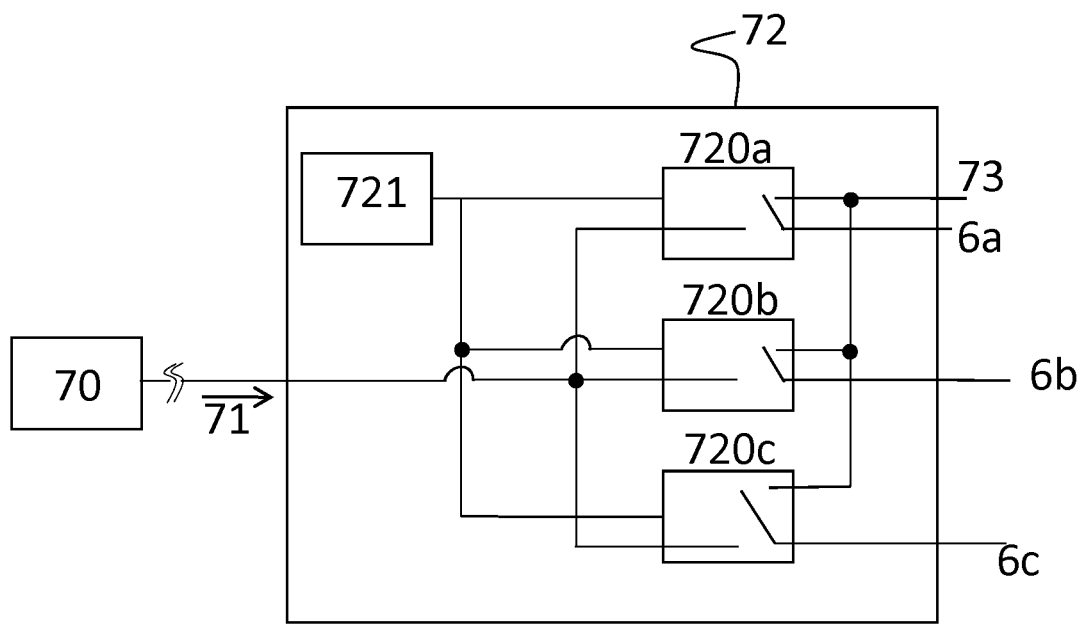
FIG. 4 shows a switching unit suitable for being used in the transmitter circuit of FIG. 3.

As shown in FIG. 4, switching unit 72 comprises a plurality of switching modules 720a, 720b and 720c which are controlled by a control unit 721 (e.g. a microcontroller) to connects each antenna 6a, 6b and 6c either to the transmitter circuit 70 or to the reference potential 73. In one embodiment switching module comprise integrated switching devices, like SCR (Silicon Controlled Rectifier), yet in another embodiment, switching modules can be implemented by means of electromechanical relays.

As better described in the following, switching unit 72 can be programmed to control the switching modules in different ways so as to transmit electromagnetic waves with different polarizations. As an example, the control unit 721 can be programmed to connect only one antenna at a time to the transmitter circuit 70, while the other two are connected to the reference potential 73; since the three antennas 6a, 6b and 6c are mounted separated by 120°, by connecting one antenna to the signal and the other two to a reference potential, the three antennas work as a dipole antenna.

Switching unit 72 can be integrated in the transmitter circuit 70 or can be omitted. In the latter case, the signal generator unit 7 is provided with one transmitter circuit for each antenna so that by controlling all the transmitter circuits it is possible to transmit to one antenna the signal to be broadcasted, while the other antennas are connected to a reference potential.

Figure 5:
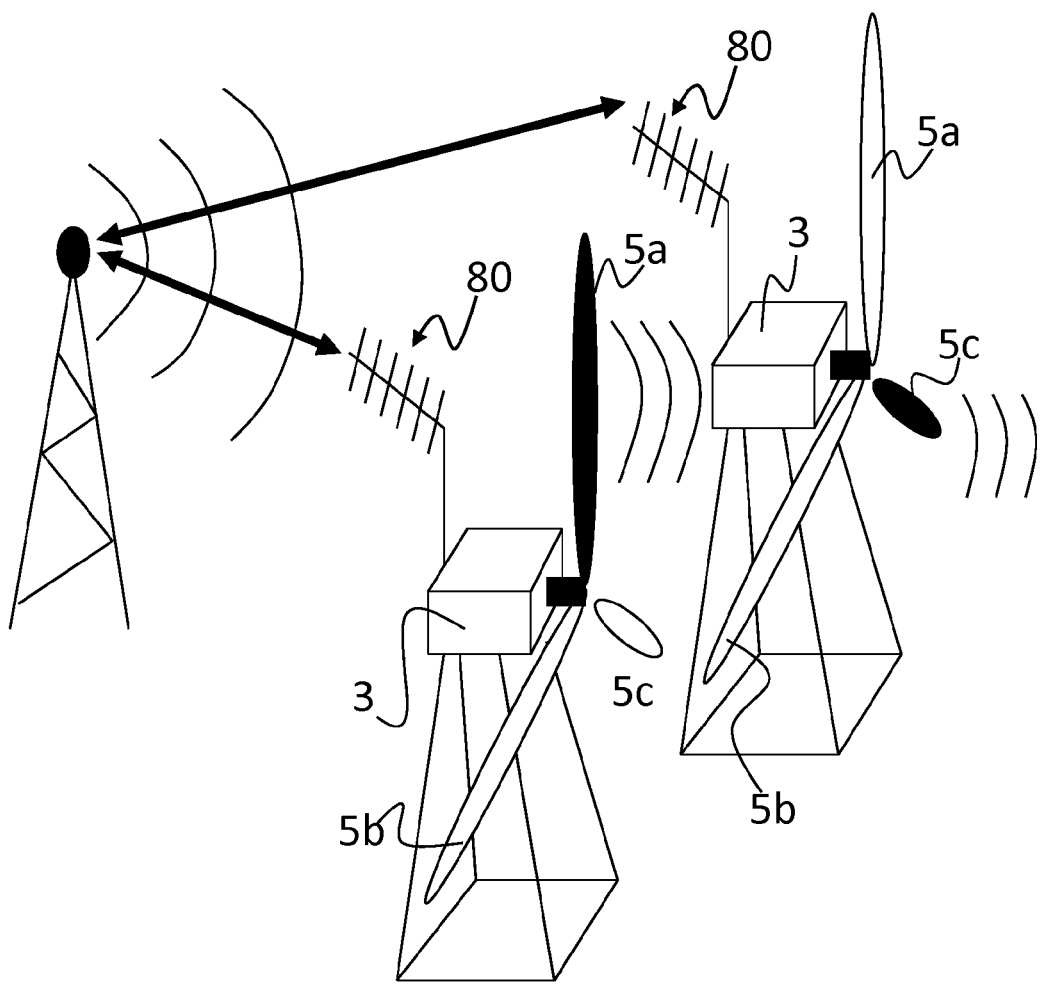
FIG. 5 shows the use of two wind turbines, according to a second embodiment of the present invention, in a telecommunication network.

In another embodiment, shown with reference to FIG. 5, wind turbine 1 comprises a receiving apparatus 8 adapted to receive signals coming from outside the wind turbine 1. As not limiting examples, the received signal may be of different nature (e.g. optical or electric) and can be received via different media, e.g. via cable or wireless.

In the embodiment of FIG. 5 the wind turbine 1 is an element of a communication network and the received signal is a radio signal transmitted by a radio equipment of the communication network; the received radio signal can be e.g. a television signal which is transmitted by a TV repeater or a signal transmitted by a radio network controller of a mobile phone network.

In order to receive signals from the outside, receiver apparatus 8 comprises a receiving antenna 80.

Figure 6:
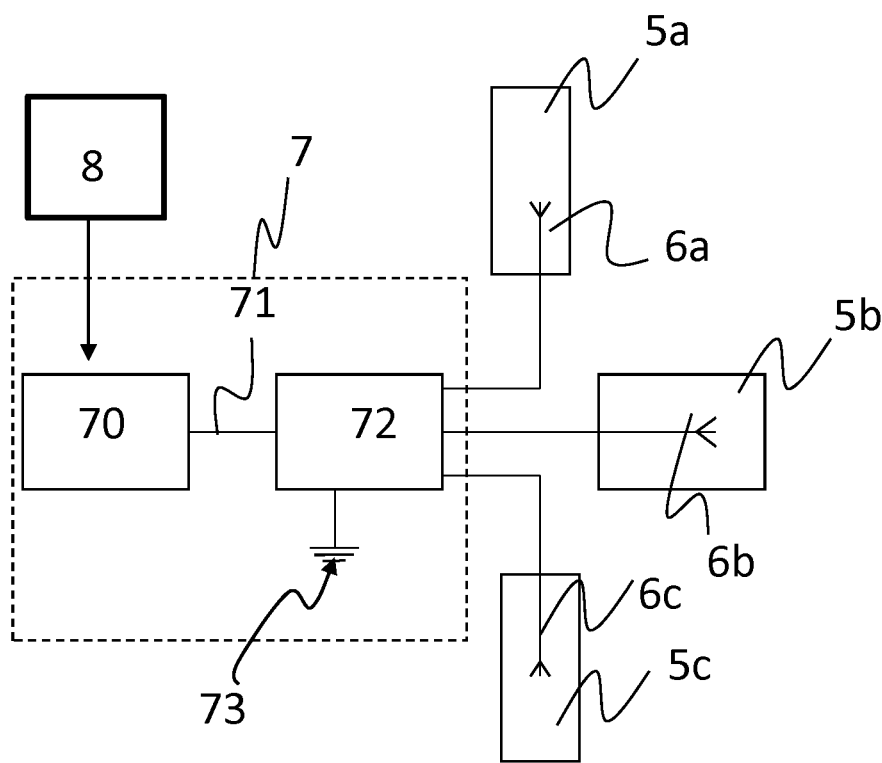
FIG. 6 a schematic representation of the transmitter circuit of the wind turbine of FIG. 5.

FIG. 6 shows a schematic representation of the electric circuits of a wind turbine provided with a receiving apparatus 8. In the embodiment of FIG. 6, the wind turbines 1 comprises the same means of FIGS. 1 and 3 for transmitting radio signals via antennas 6a, 6b and 6c placed in the blades of the wind turbine. Receiving apparatus 8 receives a signal from outside, decodes it and provides a corresponding base band signal to the transmitter circuit 70 which regenerates the signal for transmission. In this embodiment the wind turbine acts as an active repeater, yet in another embodiment it can be a passive one, i.e. it does not regenerates the signal, but receives it and retransmits it.

Figure 7:
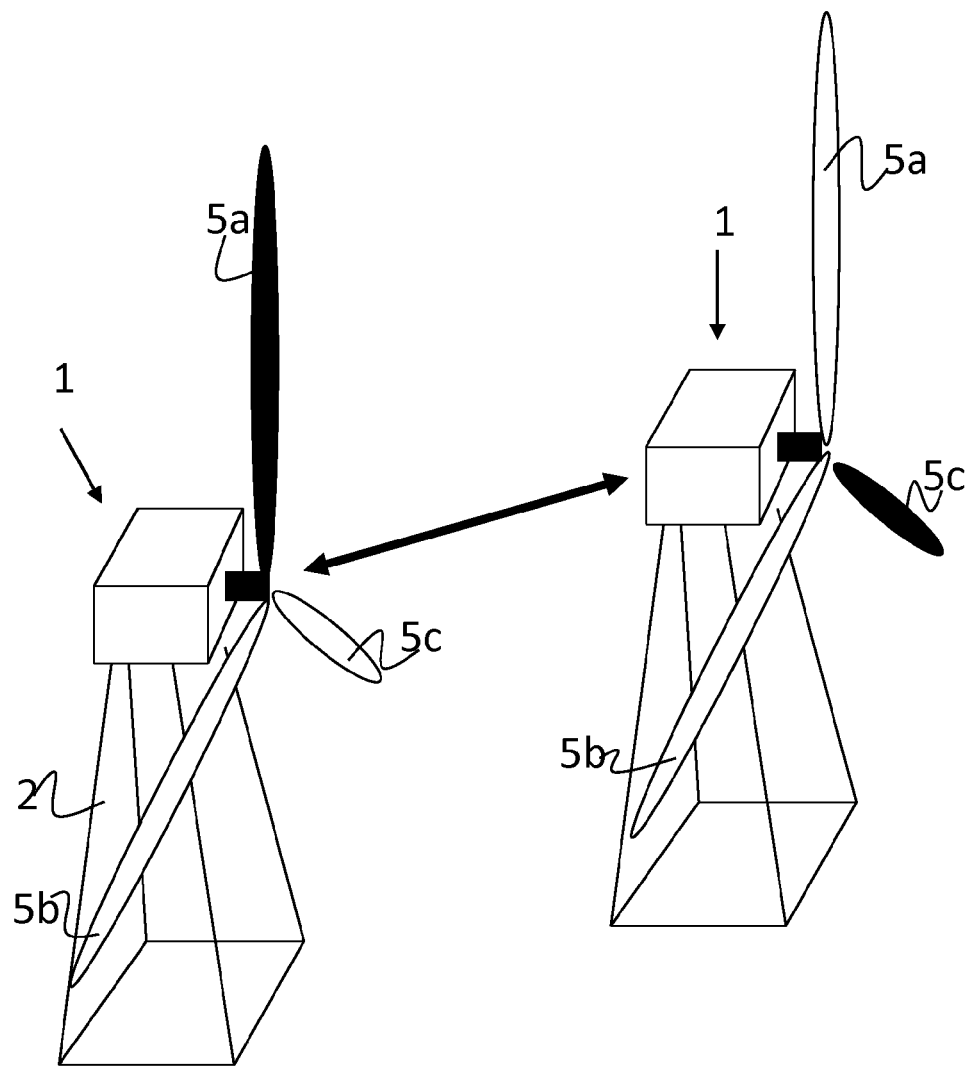
FIG. 7 shows the use of two wind turbines in a MIMO configuration.

According to another aspect of the invention, a plurality of wind turbines 1 is used to implement a MIMO (Multiple Input Multiple Output) antenna configuration, as shown in FIG. 7. Preferably at least two wind turbines 1 of said plurality are controlled so as to radiate electromagnetic waves with different polarities so as to obtain polarisation diversity and increase channel throughput. In case the wind turbines 1 are used to implement a MIMO transmission for a television network with signals transmitted in the frequency range 500 kHz to 50 GHz, the wind turbines are preferably placed at a distance comprised between 50 m and 3 km so as to obtain space diversity and increase transmission reliability.

Figure 8:
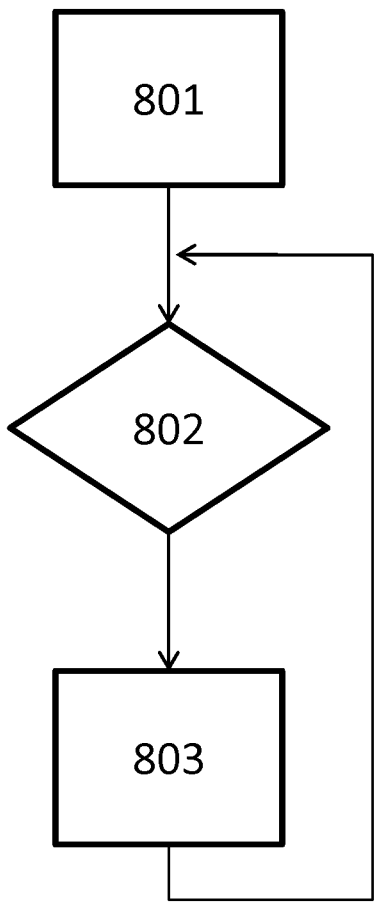
FIG. 8 is a flow chart of a method for transmitting radio signals according to the invention.

FIG. 8 is a flowchart of a method using a wind turbine according to the invention for radiating electromagnetic waves having stable polarization, even if blades are rotating.

The method starts at step 801 wherein a signal to be transmitted is generated in a transmitter circuit of the wind turbine; as said above with reference to FIGS. 5 and 6, the signal generated by the transmitter circuit can be a signal received from the outside and sent to the antennas 6a-6c for retransmission.

The method then provides for detecting (step 802) the position of the blades or at least detecting which blade is passing in a predetermined area of the rotation plane of blades 5a-5c. Preferably this area is a predetermined circular sector of the circle defined by the trajectory of the blade tip rotation, the centre of this circle being in the rotor hub 4.

In one embodiment, detection of the position of one or more blades is obtained by means of one or more sensors (in particular proximity sensors) operatively connected to the control unit 721 of the switching unit 72. Clearly this embodiment is not limitative and other solutions are possible.

At step 803 the method provides for connecting to the output of transmitter circuit 70 the antenna which has entered the predetermined area, while the other two antennas are connected to a reference potential 73 by means of the switching unit 72.

Figure 9A:
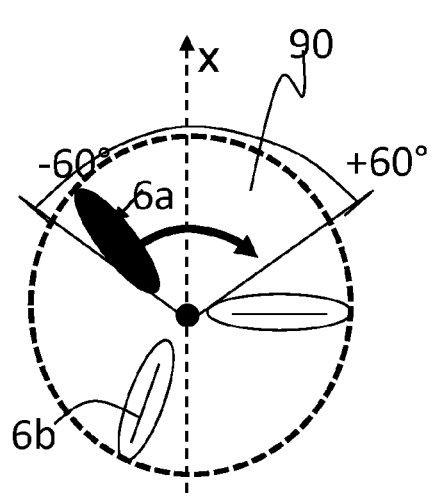
FIG. 9 shows the blades of wind turbine of FIG. 1 during different steps of the method of FIG. 8.

This is shown in FIG. 9a wherein blades 5a, 5b and 5c are supposed to rotate in clockwise direction and the method provides for applying the signal 71 to be transmitted to the antenna moving inside region 90 of the rotating plane, which is a 120° circular sector centred on the vertical direction x. In FIG. 9a antenna 6a has entered region 90 and is therefore provided with the signal to be transmitted; for this reason blade 6a is represented in black colour.

Figure 9B:
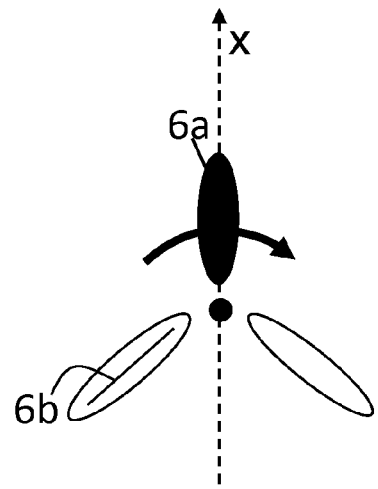

After the signal has been provided to an antenna (in the case of FIG. 9a antenna 6a), the method provides for waiting the detection of the next antenna entering the predetermined space region 90. Meanwhile the signal to be transmitted is always provided to the input of the first selected antenna, as can be seen from FIG. 9b wherein antenna 6a is placed along the vertical direction and the signal is still applied to this antenna.

Figure 9C:
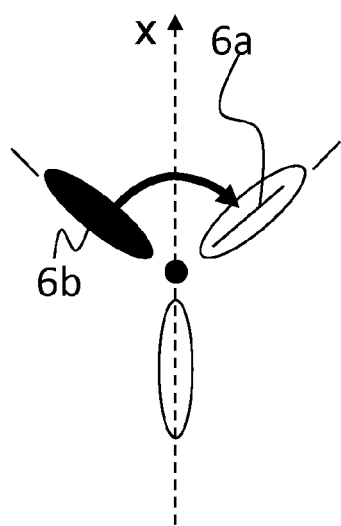

From step 803, therefore, the method goes back to step 802. When a new blade enters space region 90, then the signal is applied to the antenna included in the new detected blade, while a reference potential is applied to the other two antennas. This is shown in FIG. 9c, wherein the signal is switched from the antenna 6a to the antenna 6b (here in black) included in the blade 5b that is now entering the space region 90.

Figure 10:
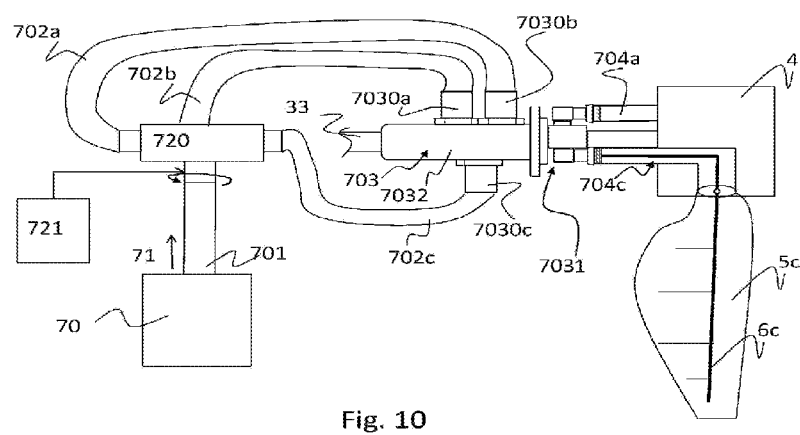
FIG. 10 shows electric connections from an antenna to the transmitter circuit of the wind turbine of FIG. 1.

FIG. 10 shows a particular of the wind turbine according to one embodiment of the invention. In this embodiment, the transmitter circuit 70 generates an high frequency signal 71 which is fed to a circulator 720 via a coaxial cable 701. Circulator 720 is, in general, a device with a plurality of ports which feeds an input signal (received on a first port) alternatively to one output port and then to the adjacent output port. Switching of the signal from one output port to another is preferably controlled by a control unit, yet other electromechanical solution can be implemented which switch the input signals to the output ports in cyclic way.

FIGS. 10a, 10b and 10c show different views and details of the circulator 720 used in one embodiment of the invention.

Circulator 720 has an external circular housing 7201 comprising four connectors 7202, 7203a, 7203b and 7203c.

Connector 7202 is a rotatable connector for connection to a coaxial cable bearing the input signal to be switched to the output connectors 7203a, 7203b and 7203c. In the embodiment of FIG. 10, cable 701 is therefore connected to connector 7202.

Housing 7201 is preferably a metallic one, so that is can be used as ground plane, as shown in FIGS. 10a-10c, wherein the external conductors 7010 of the coaxial cable 701 are connected (via connector 7202 to the housing 7201.

In another embodiment, circulator 720 comprises a metallic plate that is placed inside the housing and used as ground plane.

Inside housing 7201 two metal sheets 7204 and 7205 are mounted free to rotate around a central axis y under control of an external device. In one embodiment movement of the two metal sheets is obtained via electromagnets opportunely placed inside the housing 7201 so that, once activated they move the two metal sheets. Metal sheets 7204 and 7205 are separated so as to avoid electrical contact. Metal sheets 7204 and 7205 are blended so that together they form a connector having substantially cylindrical form with rotation axis y. Metal sheet 7204 is connected to the internal conductor of connector 7202, while metal sheet 7205 is connected to the external conductor of connector 7202 as shown in FIG. 10c.

The section of metal sheet 7205 on a plane Ω (orthogonal to the rotating axis y) is an arc subtended by an angle θ equal to 360°/N wherein N is the number of output ports (three in the example of FIG. 10a-10c). The section of metal sheet 7204 on the same plane Ω is complementary to form a circumference interrupted in two points 7206 and 7207.

Connectors 7203a, 7203b and 7203c are provided with an external cylindrical contact (7208a, 7208b and 7208c) and an internal contact (7209a, 7209b and 7209c). The internal cylindrical contact comprises a sliding contact (7210a, 7210b and 7210c); by rotating metal sheets 7204 and 7205 around axis y, this sliding contact is put in contact alternatively with metal sheet 7204 and 7205. Due to the shaping and dimensions of metal sheets 7204 and 7205, this means that the input signal 71 is provided on the internal conductor of only one (connector 7203a in FIG. 10b) of the output connectors 7203a, 7203b and 7203c, while the internal conductor of the other two connectors (connector 7203b and 7203c in FIG. 10b) will be connected to the external connector of the input cable 701, i.e. they are connected to ground.

Coaxial cables 702a, 702b and 702c, connect the output ports of circulator 720 to respective connectors 7030a, 7030b and 7030c of a three channel rotary joint 703, which allows transmission of the signals received at connectors 7030a, 7030b and 7030c to the coaxial cables 704a, 704b (not shown in FIG. 10) and 704c connected to antennas 6a, 6b (not shown) and 6c.

Rotary joint 703 is a device comprising two main bodies (7031 and 7032) that can rotate one with respect to the other. Each body comprises three ports for connection with respective cables. Independently from rotation of the two bodies 7031 and 7032, each port of one body is kept in constant communication (e.g. via optical links or sliding contacts) with one respective port of the other body.

Rotary joints are per se known and are sold on the market by several manufacturers, like Spinner GmbH.

In the embodiment of FIG. 10, rotary joint 703 is mounted on the main shaft 33 in such a way that body 7032 remain fix while body 7031 rotates with the hub and the main shaft; electric generator 30, a high speed rotor shaft 31 and a gearbox 32 are therefore not shown for clarity reasons.

Clearly in another embodiment the rotary joint can be mounted on the high speed rotor shaft 31, or on any other shaft mechanically connected to the rotor hub 4.

Figure 11:
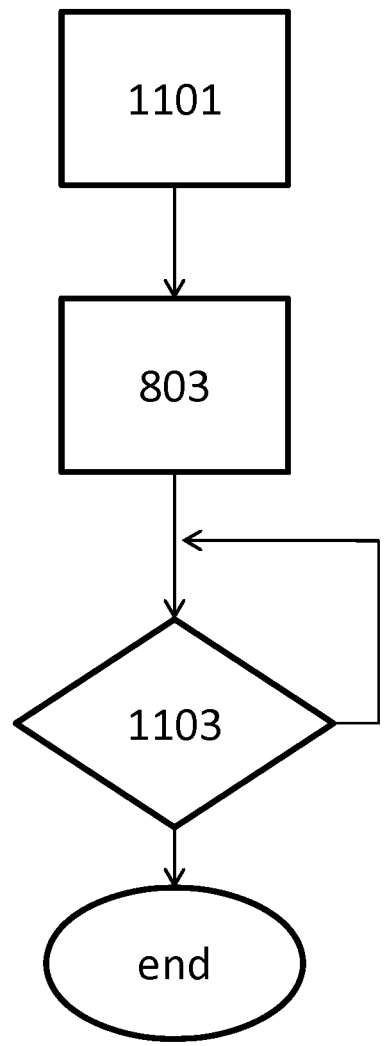
FIG. 11 is a flow chart of a method for transmitting radio signals according to a second embodiment of the invention.

FIG. 11 shows the flow chart of a second method using wind turbine 1 for radiating electromagnetic waves; in particular the method of FIG. 11 allows radiating electromagnetic waves (e.g. radio signals) having circular polarization in case of wind conditions wherein the blades are rotating.

The method starts at step 1101 by deciding to transmit radio signals with a circular polarization; then (step 1102) a signal to be transmitted (e.g. transmission signal 71 in FIG. 3) is applied to an antenna (e.g. antenna 6c) included into one of the wind turbine's blades. The remaining antennas are connected to a reference potential.

Preferably, according to the method of FIG. 11 antenna connections are stable in time.

When blades are rotating this method allows radiating an electromagnetic wave having circular polarization since the wave polarization vector rotates with the blades rotation.

The method ends at step 1103 when a decision of terminating the transmission of circular polarized electromagnetic waves by means of the wind turbine 1.

Figure 12:
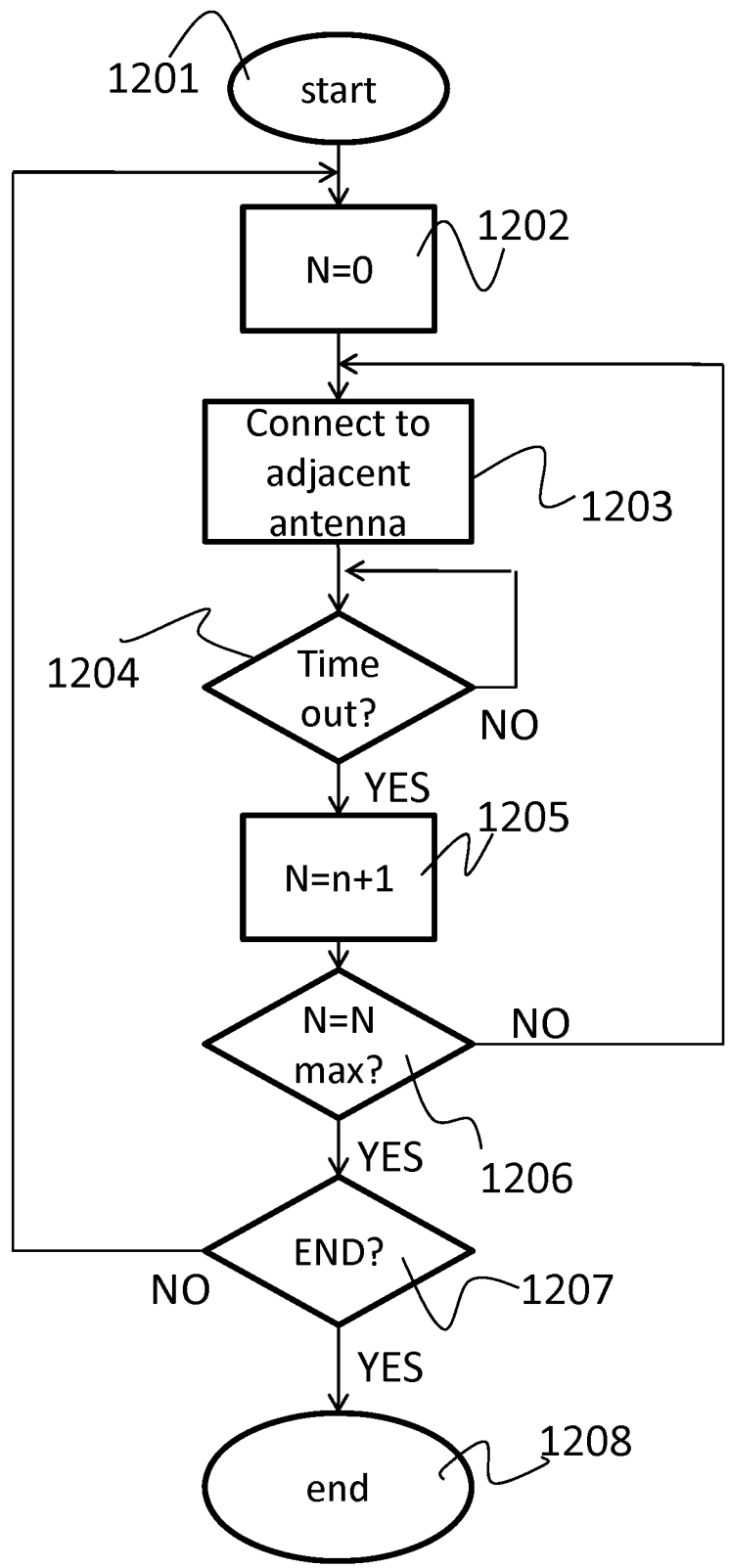
FIG. 12 is a flow chart of a method for transmitting radio signals according to a third embodiment of the invention.

FIG. 12 shows a third method using wind turbine 1 for radiating electromagnetic waves having elliptical or circular polarization when blades are not rotating.

Figure 13A:
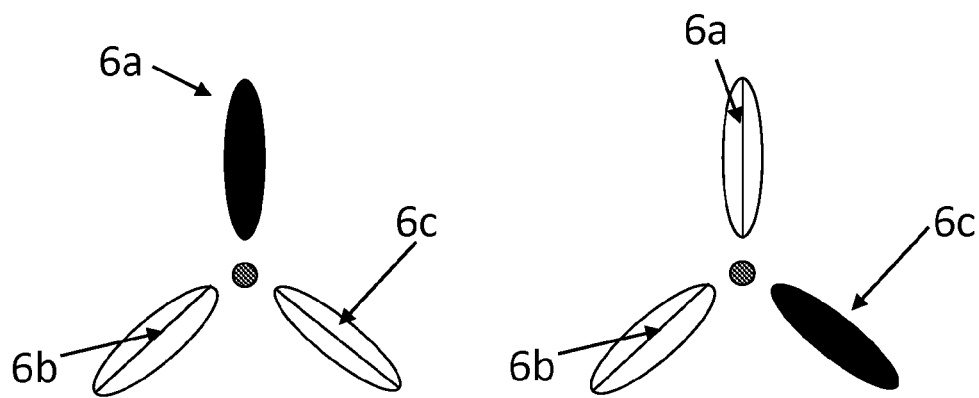
FIG. 13 shows the blades of wind turbine of FIG. 1 during different steps of the method of FIG. 12.

In this embodiment, the method starts at step 1201 by deciding to transmit radio signals with a circular or elliptical polarization. At step 1202 a counter N is set to zero, then (step 1203) a signal to be transmitted (e.g. transmission signal 71 in FIG. 3) is applied to an antenna included into one of the wind turbine's blades, while the remaining antennas are connected to a reference potential. This step is shown in FIG. 13a wherein the blade including antenna 6a is in black to indicate that the signal is provided to this antenna, while the blades including antennas 6b and 6c are in white to indicate that they are connected to a reference potential.

As the signal is applied to the first antenna (6a in FIG. 13a), a timer is started to count the time (step 1204) the signal is applied to this antenna.

When the predetermined time counted by timer at step 1204 is elapsed, the counter N is increased of one unit (step 1205); if (step 1206) N is now equal to the number of antennas (three in the embodiment of FIGS. 13a-13c) of the wind turbine, then the methods provides for checking if the signal transmission is terminated, in positive case, the method ends (step 1208), otherwise the method goes back to step 1202, N is set to zero and there's another iteration of the method.

In case at step 1206 N is not equal to the maximum number of wind turbines, the method goes back to step 1203 and the signal is applied to the next adjacent antenna in clockwise direction; clearly it is possible to apply the signal to be radiated to the antenna in anticlockwise direction.

Figure 13B:
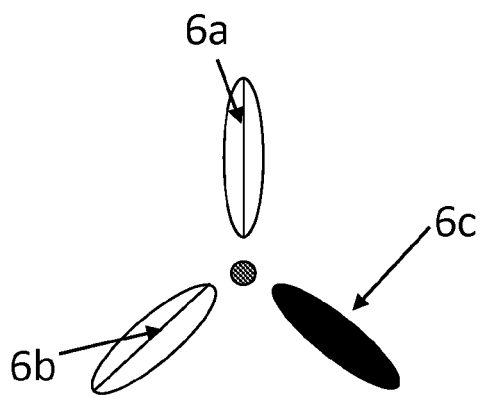
Figure 13C:
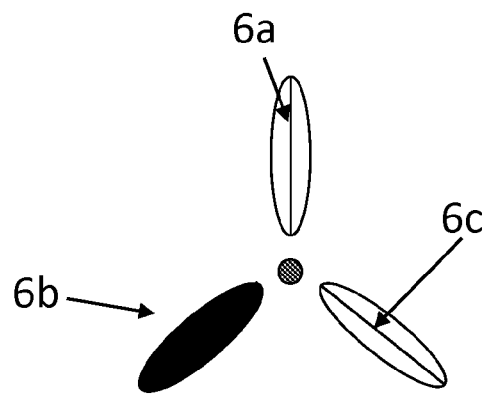

With reference to FIGS. 13a-13c, when N is increased from 0 to 1, then the signal to be transmitted is applied to the antenna 6c (black in FIG. 13b) which is adjacent to antenna 6a in clockwise direction. When N is increase from 1 to 2 the signal is applied to antenna 6b (black in FIG. 13c) and finally, when N is set to 0, the signal is again applied to antenna 6a (FIG. 13a).

The above disclosure shows that the invention fulfils the intended objects and, particularly, overcomes some drawbacks of the prior art.

The method and the system described permits to generate energy and transmit electromagnetic waves via a common wind turbine structure.

The wind turbine and the methods according to the invention are susceptible of a number of changes and variants, which are considered to fall within the inventive concept as defined by the appended claims. All the details can be replaced by other technically equivalent parts without departing from the scope of the present invention.

While the wind turbine and the method have been described with particular reference to the accompanying figures, the numerals referred to in the disclosure and claims are only used for the sake of a better intelligibility of the invention and shall not be intended to limit the claimed scope in any manner.

The invention claimed is:

1. A wind turbine comprising:
   a plurality of blades;
   an electric generator coupled to said plurality of blades for converting movement of said plurality of blades into electric energy, wherein each blade of said plurality of blades includes a respective antenna;
   a transmitter circuit for feeding at least one of said antennas with a signal to be radiated; and
   a switch disposed between said transmitter circuit and the antennas comprised in said plurality of blades,
   wherein said switch is adapted to connect or disconnect one or more of said antennas to said transmitter circuit,
   wherein said switch is further adapted to connect antennas that are not connected to the transmitter circuit to a reference potential such that the antennas are connected to one of said transmitter circuit or said reference potential,
   wherein the switch is configured to connect the antennas to the transmitter circuit and to the reference potential based on a position of at least one of the plurality of blades.

2. The wind turbine according to claim 1, wherein said switch is a signal circulator.

3. The wind turbine according to claim 1, wherein said plurality of blades are mechanically connected to a rotor hub, wherein said rotor hub is mechanically connected to a rotary joint, said rotary joint comprising at least an input and an output port and being suitable for allowing constant communication between the input and the output port, said input port being connected to said switch and said output port being operatively connected to at least one of said antennas.

4. The wind turbine according to claim 1, further comprising a receiver apparatus for receiving an input signal coming from outside said wind turbine, said receiver apparatus being operatively connected to said transmitter circuit so that said signal to be radiated depends on the input signal.

5. The wind turbine according to claim 1, further comprising at least one sensor for detecting if one of the plurality of blades is in a predetermined position.

6. A wind farm comprising:
a plurality of wind turbines according to claim 1, wherein said wind turbines are opportunely spaced, the transmitter circuits of the wind turbines being adapted to transmit the same signal in a synchronized way, with different or identical polarization, so as to implement a (Multiple Input Multiple Output) MIMO configuration for spatial multiplexing.

7. A telecommunication network comprising:
a wind turbine according to claim 1, wherein said wind turbine is configured as a repeater of the communication network, said wind turbine comprising a receiver apparatus suitable for receiving signals coming from external devices, so as to process the received signal in order to obtain the signal to be transmitted via the transmitter circuit and the antenna comprised in the blade.

8. A method for transmitting radio signals to a receiving apparatus, the method comprising:
transmitting a radio signal by at least one of said antennas included in the wind turbine according to claim 1, and
connecting all antennas that are not transmitting the radio signal to the reference potential during a time period.

9. The method according to claim 8, wherein said plurality of blades are moving and wherein the method further comprises:
generating said signal to be radiated,
detecting a blade included in said plurality of blades in a predetermined space region,
feeding an antenna included in the detected blade with said signal to be radiated.

10. The method according to claim 9, wherein the method further comprises:
wherein the step of detecting comprises said blades being equally distributed around a circular rotor hub and wherein said space region is the area of the circular sector delimited by an arc of circumference having centre in the centre of the rotor hub and extending between two adjacent antennas.

11. The method according to claim 8, wherein said method further comprises:
keeping said plurality of blades in stationary conditions without rotation of a wind turbine hub,
generating said signal to be radiated,
feeding for a predetermined time said signal to be radiated to a first antenna included in a first blade of said plurality of blades,
after said predetermined time has elapsed feeding said signal to be radiated to a second antenna adjacent to said first antenna.

12. The method according to claim 11, wherein said signal to be radiated is applied to said second antenna for said predetermined time and wherein, after said predetermined time is elapsed, the signal to be radiated is then applied to an adjacent antenna.

13. The method according to claim 8, further comprising transmitting signals with a predetermined polarization.

* * * * *